(12) United States Patent
Goo

(10) Patent No.: US 7,471,013 B2
(45) Date of Patent: Dec. 30, 2008

(54) SYSTEM OF SMART KEY FOR AUTOMOBILE

(75) Inventor: Ja Yoon Goo, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 45 days.

(21) Appl. No.: 11/648,861

(22) Filed: Dec. 29, 2006

(65) Prior Publication Data
US 2008/0100138 A1 May 1, 2008

(30) Foreign Application Priority Data
Oct. 31, 2006 (KR) .................. 10-2006-0106076

(51) Int. Cl.
*B60R 25/04* (2006.01)
*E05B 17/00* (2006.01)
*H01H 27/00* (2006.01)
(52) U.S. Cl. .................... 307/10.3; 307/10.6
(58) Field of Classification Search ........ 307/10.3, 307/10.6
See application file for complete search history.

(56) References Cited

U.S. PATENT DOCUMENTS 5,255,547 A * 10/1993 Burr et al. ............ 70/252

FOREIGN PATENT DOCUMENTS

| JP | 54-153442 | 12/1979 |
|---|---|---|
| JP | 62-128857 | 6/1987 |
| JP | 63-061665 | 3/1988 |
| JP | 11-071942 | 3/1999 |
| JP | 11-217965 | 8/1999 |
| JP | 2004-237801 | 8/2004 |
| JP | 2004-237887 | 8/2004 |

\* cited by examiner

*Primary Examiner*—Michael J Sherry
*Assistant Examiner*—Carlos Amaya
(74) *Attorney, Agent, or Firm*—Morgan, Lewis & Bockius LLP

(57) ABSTRACT

A smart-key-start-up device for an automobile includes a control module configured to receive signals about an operation state of the automobile; a lock-preventing circuit controlled by the control module; a knob housing; a user-operable start-up knob disposed in the knob housing; and a slidable projection on the start-up knob, controlled by the lock prevention circuit based on the operation state of the automobile.

1 Claim, 5 Drawing Sheets

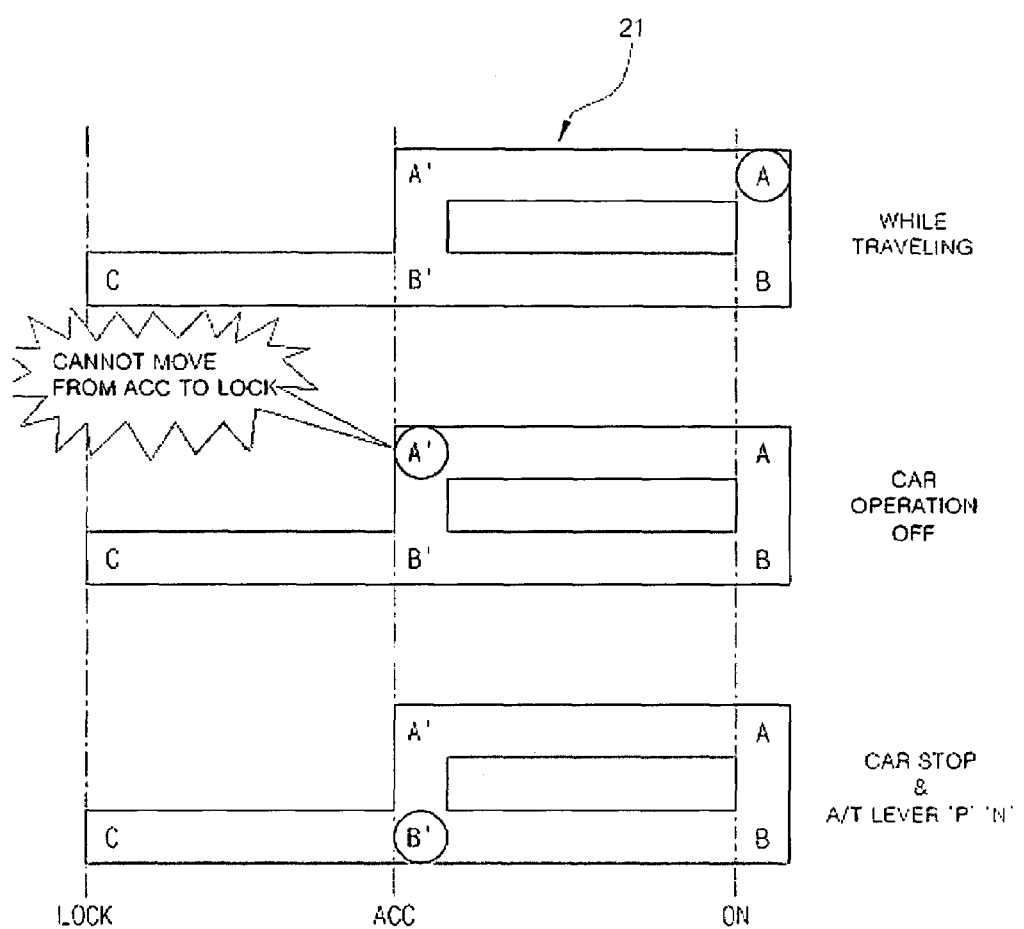

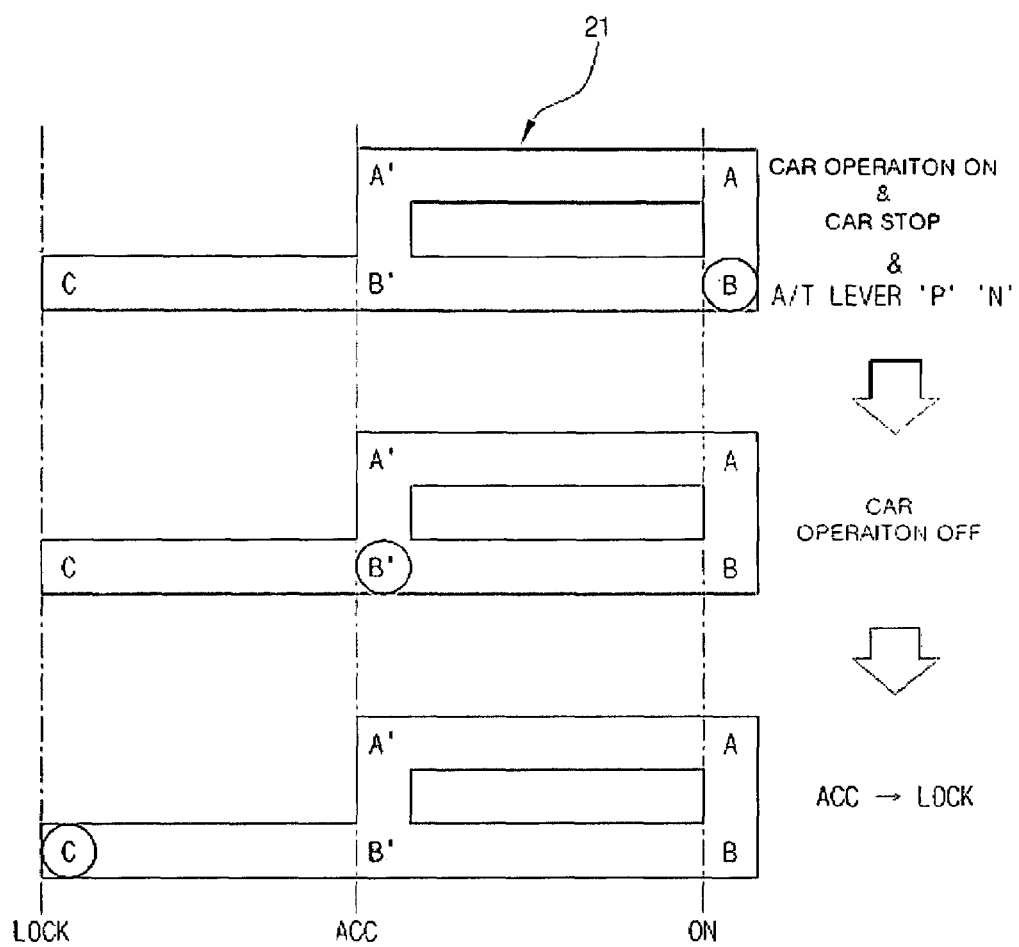

SYSTEM OF SMART KEY FOR AUTOMOBILE

CROSS-REFERENCE TO RELATED APPLICATION

This application claims priority to and benefit of Korean Patent application No. 10-2006-0106076, filed on Oct. 31, 2006, in the Korean Intellectual Property Office, the disclosure of which is incorporated herein by reference.

BACKGROUND OF THE INVENTION

1. Field of the Invention

The present invention relates to a smart key system for an automobile.

2. Description of the Related Art

In a typical smart key system, a driver can unlock his car without inserting the key, and if the smart key is inside the car, the driver can start his car using an ignition switch without inserting the key.

Door antennae mounted on the body of the door handle sense the smart key, thereby unlocking the door. Further, two indoor antennae sense whether the smart key is inside the car and allow ignition.

A body control module (BCM), driver door module (DDM), and an assist door module (ADM) are connected to an immobilizer unit (IMMO unit) and a PIC unit via a controller area network (CAN).

The IMMO unit controls the start-up and is connected to an engine control unit (ECU), and the PIC unit controls the operation of a mechanical steering lock, a door handle, a steering wheel, a door-driving handle, and various antennae.

A diffusion smart key has a knob-type structure in order to start up the car without inserting the key. The car can be started by rotating the knob.

A push-release function is applied when turning the knob from "ACC" to "LOCK" to prevent the knob from being erroneously turned to "LOCK". The push-release function is an inconvenience to users.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a smart-key-start-up device for an automobile, including a body control module (BCM) that receives a signal from a wheel-speed sensor, an automatic transmission (A/T) lever position sensor, and an electronic throttle control (ETC). A knob assembly includes a lock-preventing circuit and is controlled by the BCM.

In some embodiments, the knob assembly includes a start-up knob with a rotation bar, and a knob housing in which the start-up knob is rotatably mounted.

In some embodiments, a slidable projection is provided on the surface of the start-up knob.

A guide groove may be provided in an internal circumference of the knob housing in such a manner that the projection travels along the guide groove.

The guide groove may include longitudinal grooves of different lengths: a first longitudinal groove at an upper side, serving as a driving section including a right end position (ON position) and a left end position (ACC position), in which an engine is turned off when the projection moves from the right end position to the left end position; and a second longitudinal groove at a lower side, serving as a car stop section including a right end position (ON position), a middle position (ACC position), and a left end position (LOCK position), in which power is turned off when the projection moves from the right end position to the left end position through the middle position. The longitudinal grooves are connected with each other so as to allow the projection to move between them in such a manner that the right end positions of both longitudinal grooves are interconnected with each other, and the left end position of the first longitudinal groove is interconnected to the middle position of the second longitudinal groove, and in which the lock preventing circuit is configured to receive a lock signal or unlock signal from the BCM and accordingly adjust the position of the projection to an upper position (A) or an lower position (B) in response to the signal within the knob housing.

BRIEF DESCRIPTION OF THE DRAWINGS

These and other aspects and advantages of the invention will become apparent and more readily appreciated from the following description of exemplary embodiments, taken in conjunction with the accompanying drawings, in which:

FIG. 6 illustrates the state of preventing movement from "ACC" to "LOCK" when operating the knob according to an embodiment of the present invention.

FIG. 7 illustrates normal operation of the knob according to an embodiment of the present invention.

DETAILED DESCRIPTION OF THE PREFERRED EMBODIMENTS

Hereinafter, preferred embodiments of the present invention will be described with reference to the attached drawings.

Figure 1:
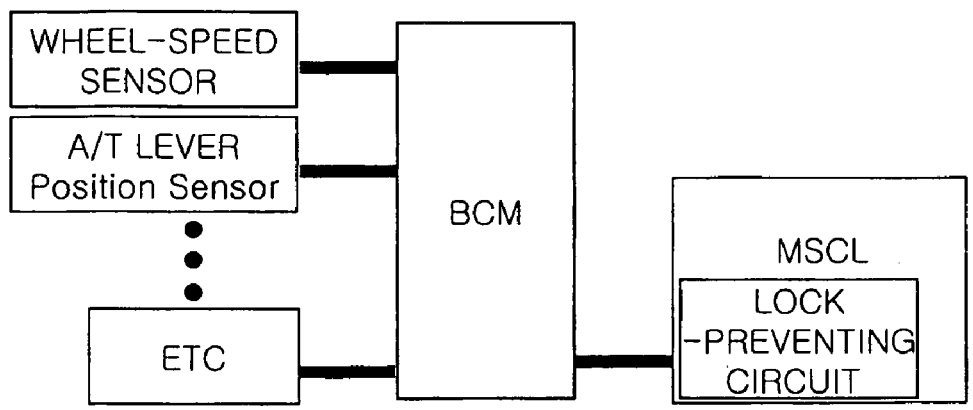
FIG. 1 is a block diagram illustrating the structure of a start-up device of a smart key for an automobile according to an embodiment of the present invention.
Figure 2:
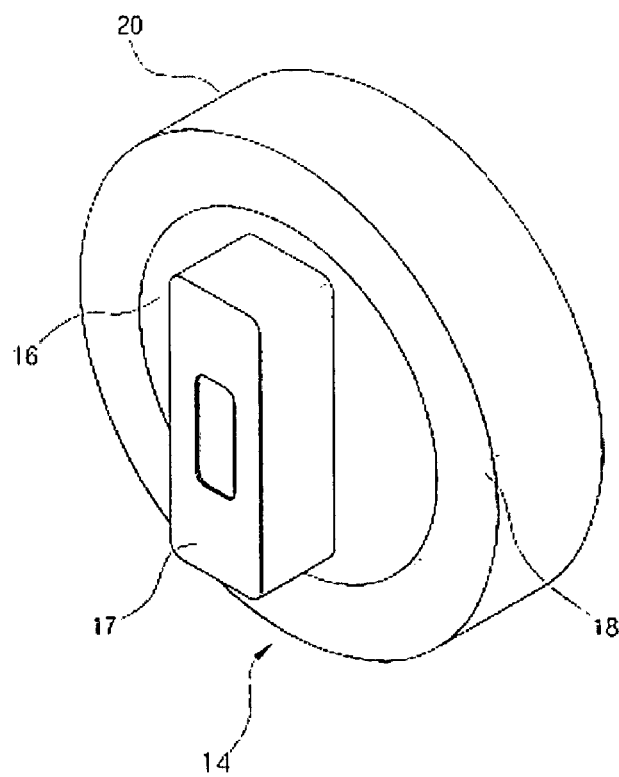
FIG. 2 is a perspective view illustrating a knob assembly according to an embodiment of the present invention.
Figure 3:
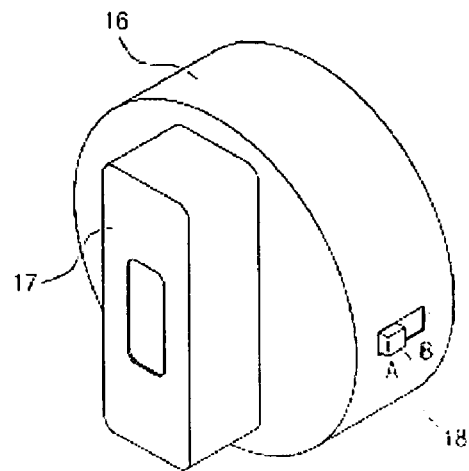
FIG. 3 is a perspective view illustrating a start-up knob according to an embodiment of the present invention.
Figure 4:
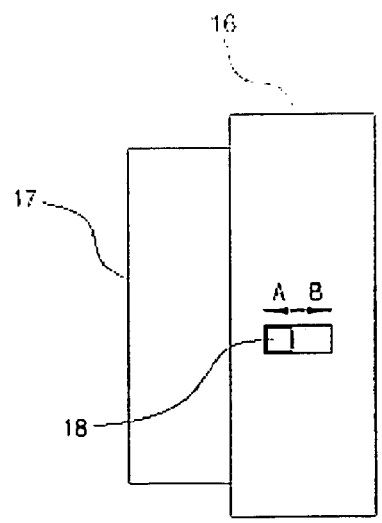
FIG. 4 is a side view of FIG. 3.
Figure 5:
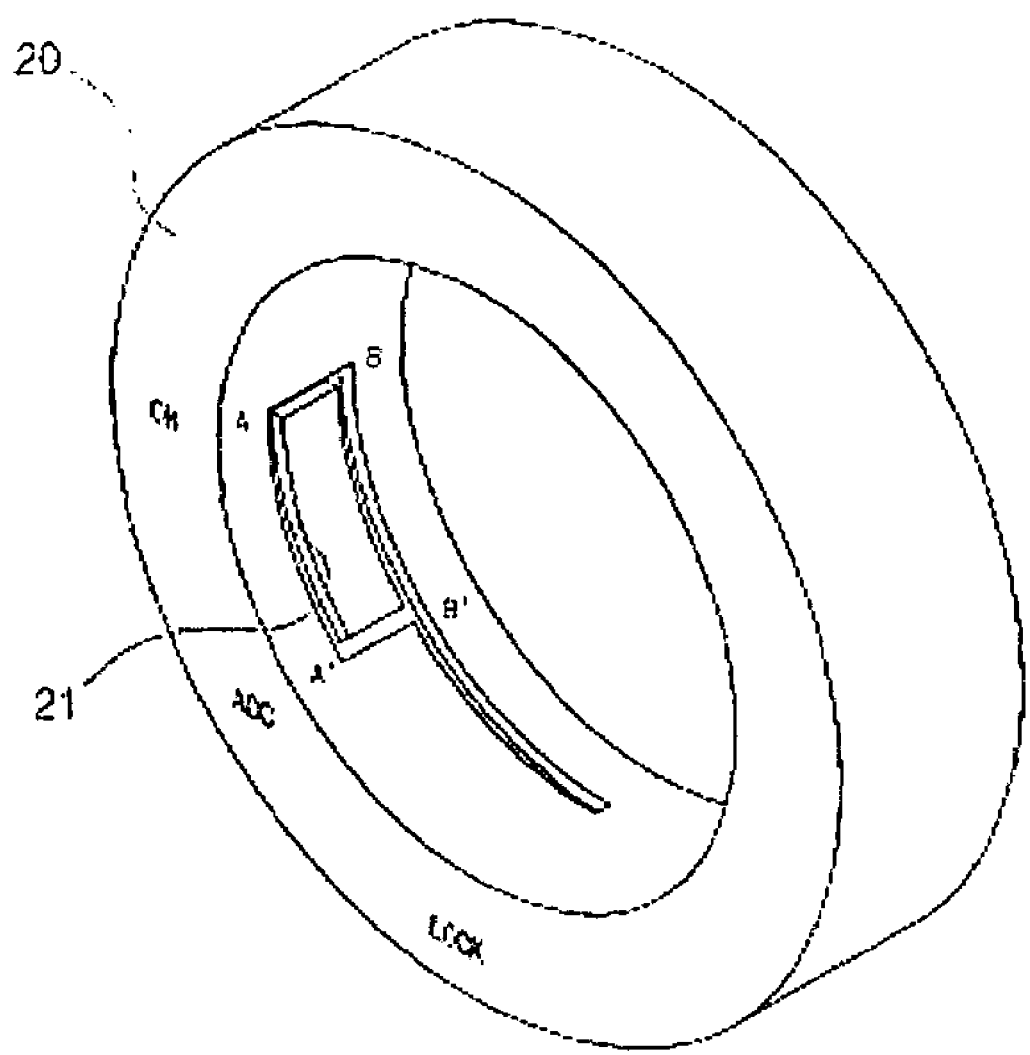
FIG. 5 is a perspective view illustrating a knob housing according to an embodiment of the present invention.

Referring to FIG. 1, a smart-key-start-up device according to an embodiment of the present invention includes a wheel-speed sensor, an automatic transmission (A/T) lever position sensor, a body control module (BCM) that receives the signal input from an electronic throttle control (ETC), a lock-preventing circuit, and a knob assembly 14 controlled by the BCM.

The knob assembly 14 includes a start-up knob 16 including a rotation bar 17 configured such that the user can grab and rotate the bar 17, and a knob housing 20 that covers the circumference of the knob 16 in such a manner the knob 16 can be rotated within the housing 20.

In some embodiments, the start-up knob 16 is cylindrical. The height is shorter than the diameter, and the rotation bar 17 has an appropriate size such that the user can easily grab the bar 17.

A projection 18 is slidably projected along a radial direction on the circumference of the start-up knob 16. The projection 18 slides according to the lock and unlock signal from the BCM.

A containing unit is provided in the center of the knob housing 20 in such a manner that the start-up knob 16 is inserted and rotated, and a "P"-shaped guide groove 21 is formed at the inside of the containing unit in the circumferential direction.

The guide groove 21 includes an A-A' route and a B-B' route having different lengths. The A-A' route is an operation route when the user turns off the engine from "ON" to "ACC".

The B-B' route can be manipulated from "ON" to "ACC", an further, to "LOCK" if the car is stopped or the A/T lever is in "P" or "N".

Specifically, the projection 18 started from A position (ON) in the driving condition stops at A' position (ACC), and the projection 18 started from B position (ON) in the stop condition can move to C position (LOCK) via B' position (ACC).

Here, the projection 18 in A' position can move to B' position if the car is stopped or the A/T lever is in "P" or "N."

The lock-preventing circuit 15 receives the lock or unlock signal from the BCM, and regulates the position of the projection along the A or B track in the knob housing 20.

The projection 18 of the start-up knob 16 is moved in A or B position along the guide groove 21 when the start-up knob 16 is rotated. The projection cannot move from "ACC" to "LOCK" when the car is moving.

As described above, by making a projection of a start-up knob move from the position of "A" or "B" along a guide groove on the knob housing when the start-up knob is rotated, the projection does not move from "ACC" to "LOCK" erroneously while the car is moving.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A smart-key-start-up device for an automobile, comprising:
    a control module configured to receive signals about an operation state of the automobile;
    a lock-preventing circuit controlled by the control module;
    a knob housing;
    a user-operable start-up knob disposed in the knob housing;
    a slidable projection on the start-up knob, controlled by the lock prevention circuit based on the operation state of the automobile; and
    a guide groove in the knob housing configured for the projection to travel therein, wherein the guide groove comprises:
        a first groove comprising an ON position and an ACC position, wherein an engine is turned off when the projection moves from the ON position to the ACC position; and
        a second groove comprising an ON position, an ACC position, and a LOCK position, wherein power is turned off when the projection moves to the LOCK position;
    wherein the grooves are connected to each other to allow the projection to move between the first and second grooves, in such a manner that the ON positions of both grooves are interconnected with each other, and the ACC positions of both grooves are interconnected with each other; and
    wherein the lock preventing circuit is configured to receive a lock signal or an unlock signal from the control module and accordingly adjust the position of the projection within the knob housing in response to the lock or unlock signal.

* * * * *